(No Model.) 3 Sheets—Sheet 1.
L. M. SMITH.
RUNNING GEAR FOR VEHICLES.
No. 492,845. Patented Mar. 7, 1893.
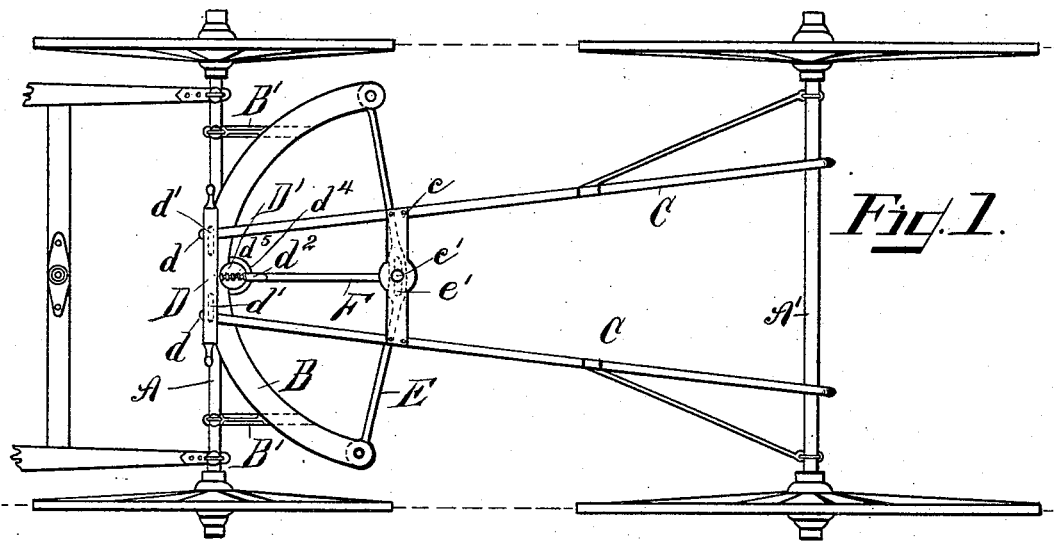
Fig. 1.
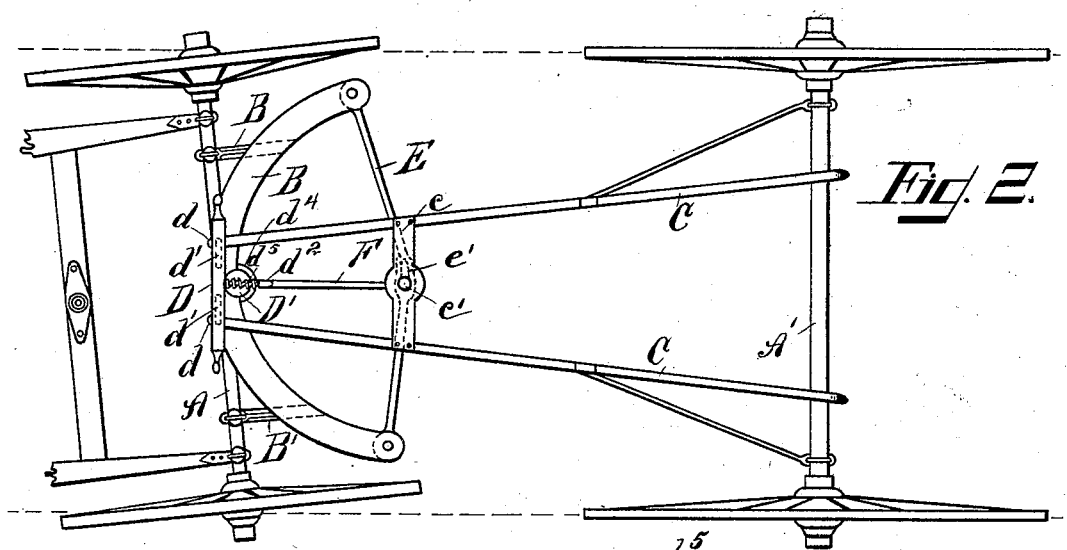
Fig. 2.
Fig. 3.
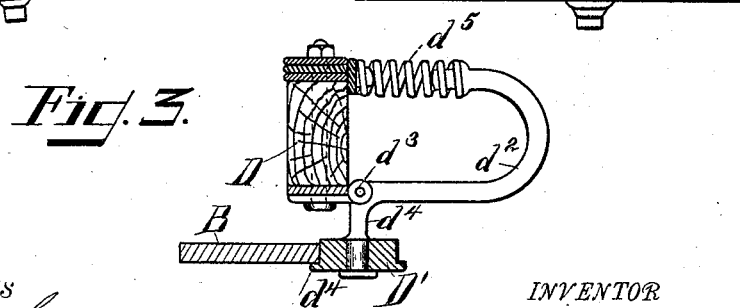
WITNESSES
F. Clough.
W. S. Bradford.
INVENTOR
Loring M. Smith
by Parker & Burton
Attorneys.

(No Model.) 3 Sheets—Sheet 2.

L. M. SMITH.
RUNNING GEAR FOR VEHICLES.

No. 492,845. Patented Mar. 7, 1893.

WITNESSES
F. Clough
D. W. Bradford

INVENTOR
Loring M. Smith
by Parker & Burton
Attorneys.

(No Model.) 3 Sheets—Sheet 3.

L. M. SMITH.
RUNNING GEAR FOR VEHICLES.

No. 492,845. Patented Mar. 7, 1893.

WITNESSES
F. Clough.
J. W. Bradford

INVENTOR
Loring M. Smith
by Parker & Burton
Attorneys.

UNITED STATES PATENT OFFICE.

LORING M. SMITH, OF ROMEO, MICHIGAN.

RUNNING-GEAR FOR VEHICLES.

SPECIFICATION forming part of Letters Patent No. 492,845, dated March 7, 1893.

Application filed February 26, 1892. Serial No. 422,873. (No model.)

*To all whom it may concern:*

Be it known that I, LORING M. SMITH, a citizen of the United States, residing at Romeo, county of Macomb, State of Michigan, have invented a certain new and useful Improvement in Running-Gears for Vehicles; and I declare the following to be a full, clear, and exact description of the invention, such as will enable others skilled in the art to which it pertains to make and use the same, reference being had to the accompanying drawings, which form a part of this specification.

Figure 4:
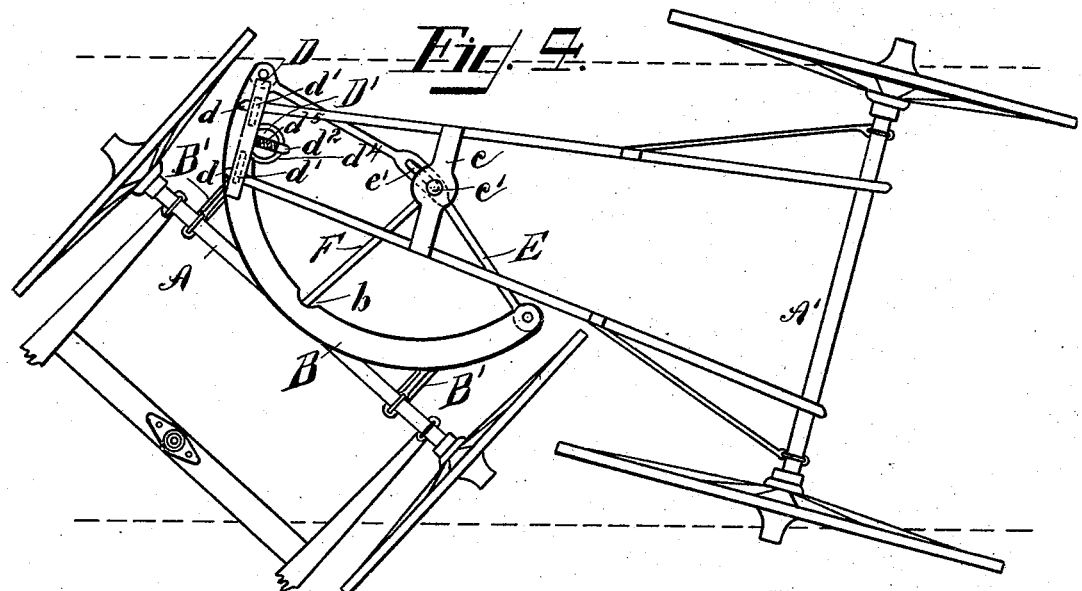
Figure 5:
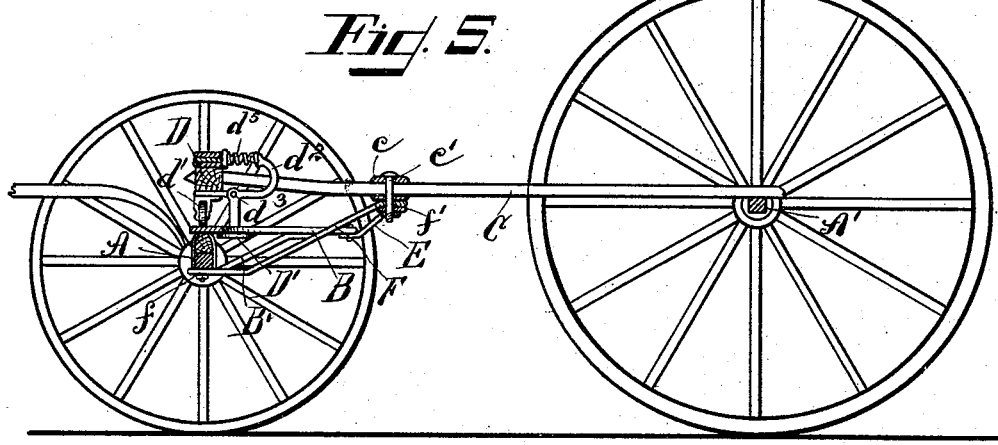
Figure 6:
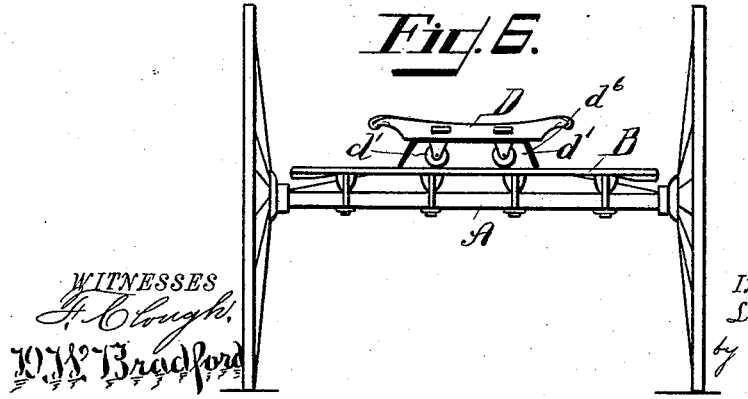

In the drawings, Figure 1 is a plan view of the running gear of a road wagon made according to my invention. In this view the gear is set straight. Fig. 2 is a similar view with the front axle turned slightly. Fig. 3 is a detail view of the device employed for carrying a guide roll. Fig. 4 is a plan view of the running gear, shown as making a turn. Fig. 5 is a sectional view showing some details of the construction. Fig. 6 is a front elevation, showing the head block and friction roller. Figs. 7, 8, 9 and 10 are views showing variations of a part of the operating mechanism of the wagon.

In the drawings, A and A' are the front and rear axles respectively of a road wagon or other vehicle.

B is a plate formed approximately on the arc of a circle with its center portion resting on the axle and its ends extending rearward and supported from the axle by the braces B'.

C, C, are the respective portions of a double reach, and are engaged at the forward end to the head block D, at $d, d$. Underneath the head block are mounted the friction rolls $d'$, adapted to travel over the face of the circle plate and support the forward end of the vehicle body thereon.

The reach C is pivoted to the gear back of the front axle and near the center of the circle, of which the circle plate is an arc. This adapts the head block D and the roll $d'$ to move over the same circle as that formed by the circle plate B, and the rolls to travel on the upper surface of the plate.

E is a portion of the frame connecting the ends of the circle plate, and is so formed as to provide an enlarged portion at the center of the circle formed by the circle plate, B, and provided with the slot $e'$.

The portions C, C, of the reach are connected by the cross bar $c$, forming a support or bearing for the king bolt $c'$. This king bolt passes through the slot $e'$, and the portion E is allowed a movement on the king bolt equal to the slot $e'$. The portion E, as it extends from the ends of the circle plate, passes under the portions C, C, of the reach, allowing the reach to swing freely over this portion.

The circle plate B is provided with a cutaway portion $b$. Pivoted to the head block D is the frame $d^2$. This frame is pivoted at $d^3$, and has a depending portion $d^4$, on which is mounted the guide roll D'. This guide roll is provided with a flange, $d^4$, adapted to hold it in engagement with the circle plate B. This roll is adapted to fit the cut-away portion $b$ of the circle plate, and is designed to hold the reach and the head block D in a central position relative to the circle plate. The frame $d^2$ is provided with a spring $d^5$, which acts to force the roll D' toward the edge of the circle plate, and into the cut away portion $b$; but when sufficient power is applied, will permit the roll to lift out of the cut-away portion and travel on the inner edge of the circle plate. The details of this mechanism are shown in Fig. 3.

To adapt the gear to be drawn from the king bolt $c'$, I provide the draft rod F. This rod is engaged with the under side of the axle at $f$, and extends upward and engages with the king bolt at $f'$.

The operation of the gear as before described is as follows: The head block D and the forward end of the reach are held in their central positions over the front axle by the engagement of the roll D' with the cut away portion $b$ of the circle plate, as long as the movement of the front axle is limited to the sliding connection permitted between the king bolt and the slot $e'$. This movement is made sufficient to meet all of the ordinary vibrations due to the inequalities of the roadway, and is preferably made equal to the vibration permitted by the shafts or tongue of the vehicle. In this manner, the front axle is permitted to vibrate around a pivot formed by the roll D' and the cut away portion $b$ of the circle plate. As soon as the vibration has reached the limit of the slot $e'$, the lateral movement of the circle plate and the portion E is stopped, and any further rotation of the front axle under the body of the vehicle lifts the roll D' out of the cut away portion $b$ of the circle plate, and causes the head block D to travel on the roll $d'$ over the upper surface of the circle plate. While the head block is traveling over the circle plate, the roll D' travels along the inner edge of the circle plate. The advantages of this construction are, that I am able to overcome the constant vibratory movement of the forward portion of the body sidewise, due to the vibration of the front axle. In this class of gear, the purpose is to throw the body sidewise and out of the way of the inside wheel on making a turn, to provide for a short turn. This is usually done by supporting the body at the point back of the axle where the reach is coupled, so that, when the shafts or pole are turned in one direction, that part of the reach in front of the coupling is thrown in the opposite direction, and carries with it the body, or the front portion of the body. This movement of the body, in constructions heretofore used, has followed every movement of the shafts or pole and the front axle, however slight, so that the vibratory movement of the front axle permitted by the pole or shafts gives an uncomfortable lateral movement to the body. This movement is increased as the coupling of the reach is moved backward, so that the coupling of the reach that provides for the shortest turn produces the most throw to the body, and, consequently, the best results in this form of construction, in making a short turn, produce the most lateral vibration to the body. By permitting all of the vibration of the front axle that the shafts or pole will permit before the coupling is permitted to move the body sidewise, I overcome the difficulty. The movement is to permit the slight vibration to be on a center approximately in the center of the axle, and the greater vibration to be on a center located back of the front axle.

Another advantage of my construction is the supporting of the load over the front axle and independent of the pivot of the reach. By placing the circle plate in front of the coupling and over the axle, I am able to employ this construction in wagons designed to carry heavy loads, such as delivery wagons, drays, farm wagons, &c. In supporting the body back of the axle and on or near the pivot of the reach, a great breaking strain is exerted on the rear, making such a construction impractical for carrying loads.

For the purpose of bringing the load in all positions of the rotation of the front axle approximately over the axle, the circle plate may be advanced and its central portion set forward of the axle.

Figure 7:
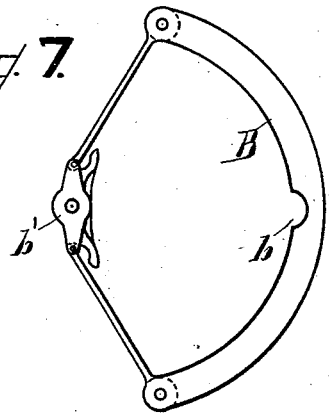
Figure 8:
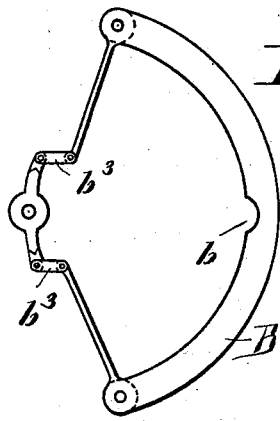
Figure 9:
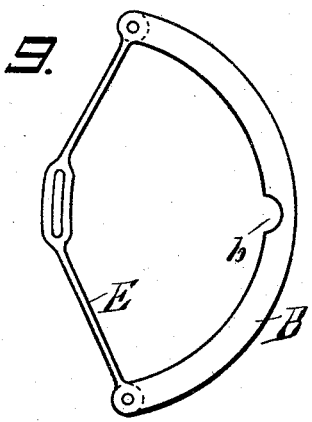
Figure 10:
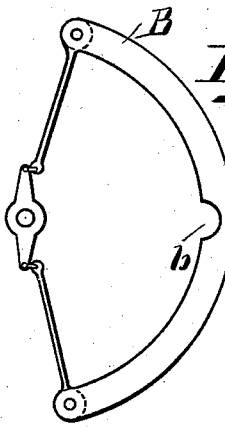

In Figs. 7, 8, 9 and 10 I show variations in the construction. In Fig. 7, instead of the slot in the frame permitting a sliding movement around the king bolt, an additional rocking lever $b'$ is pivoted to the king bolt, and a limited movement of the circle plate permitted relative to the reach. In Fig. 8, a different form of connection is shown, in which additional links $b^3$ are employed. In Fig. 9 is shown the preferred form, having the frame E pivoted at opposite ends to the circle plate. Fig. 10 is a variation similar to that shown in Fig. 8, in which ordinary links are employed.

I prefer to construct the circle plate B out of a true circle, to avoid the necessity for making it wide enough to accommodate the movement due to the slot $e'$. The king bolt on which the reach is pivoted will, on the first movement in making a turn, move to the end of the slot $e'$, and the travel of the head block D and the roll $d$ will be in a circle having the end of the slot for its center. To provide for this, I prefer to form each end of the circle plate on a circle having the opposite end of the slot for its center. By using this form, I avoid the necessity for making the circle plate wide enough to accommodate this variation.

I provide the head block with depending scrapers $d^6$, adapted to remove any accumulation of mud on the upper surface of the circle plate.

What I claim is—

1. In a running gear for vehicles, a reach coupled back of the front axle and having a forward extension adapted to support the body over the front axle, a circle-plate and frame attached to the front axle, said circle-plate having an indentation in the center of its rearward concaved side, a spring actuated roller adapted to engage in said indentation when the axle is in its normal position.

2. The combination of a reach coupled back of the front axle and having a forward extension for supporting the body over the front axle, a circle-plate on said axle, and a spring actuated bearing on said extension of said reach, engaging said circle-plate, substantially as described.

3. The combination of a reach coupled back of the front axle and having a forward extension for supporting the body over the front axle, a circle-plate on said axle, the head block on said extension, and a bearing between said head block and the side of the circle-plate adapted to engage in a detent therein, and a draft rod connecting said coupling and said axle, substantially as described.

4. The combination of a reach having its coupling between the front and rear axles, a circle-plate on the front axle having a detent on its concave side, a spring actuated bearing attached to a head block upon the forward extension of the reach and adapted to engage in said detent, and a frame connecting the ends of the circle-plate having at the coupling point a slotted opening, a king-pin connecting the reach and the frame through said slotted opening, and a draft rod connecting said bar with the front axle, substantially as described.

5. The combination of a front axle with a circle plate rigidly attached thereto and having a detent upon its concave side, a reach and a spring actuated bearing attached to said reach and adapted to be engaged and disengaged with said detent, substantially as described.

6. The combination of a reach having its coupling between the front and rear axles, a circle-plate on the front axle having a detent on its concave side, a spring actuated bearing to engage in said detent, a frame connecting the ends of the circle-plate and having at the coupling point a slotted opening, a kingpin connecting the reach and the frame through said slotted opening, substantially as described.

In testimony whereof I sign this specification in the presence of two witnesses.

LORING M. SMITH.

Witnesses:
MARION E. REEVE,
CHARLES H. FISK.